(12) United States Patent
Matsunaga et al.

(10) Patent No.: US 9,329,408 B2
(45) Date of Patent: May 3, 2016

(54) WETTABLE HYDROGEL CONTACT LENS AND METHOD FOR PRODUCING SAME

(75) Inventors: Toru Matsunaga, Tokyo (JP); Yoko Fujishiro, Tokyo (JP); Takao Sato, Tokyo (JP)

(73) Assignee: SEED CO., LTD., Tokyo (JP)

( * ) Notice: Subject to any disclaimer, the term of this patent is extended or adjusted under 35 U.S.C. 154(b) by 1031 days.

(21) Appl. No.: 13/322,864

(22) PCT Filed: Sep. 1, 2009

(86) PCT No.: PCT/JP2009/065236
§ 371 (c)(1),
(2), (4) Date: Nov. 28, 2011

(87) PCT Pub. No.: WO2010/140267
PCT Pub. Date: Dec. 9, 2010

(65) Prior Publication Data
US 2012/0074352 A1    Mar. 29, 2012

(30) Foreign Application Priority Data

Jun. 3, 2009  (JP) ................................. 2009-134090

(51) Int. Cl.
*G02C 7/04* (2006.01)
*C08L 5/04* (2006.01)
*G02B 1/04* (2006.01)

(52) U.S. Cl.
CPC . *G02C 7/049* (2013.01); *C08L 5/04* (2013.01); *G02B 1/043* (2013.01)

(58) Field of Classification Search
CPC .......... G02C 7/04; G02C 7/049; G02B 1/043; C08L 5/04
See application file for complete search history.

(56) References Cited

U.S. PATENT DOCUMENTS 4,408,845 A * 10/1983 Seiderman ............... 351/159.21
5,270,415 A    12/1993 Sulc et al.
(Continued)

FOREIGN PATENT DOCUMENTS

EP   2039370 A1   3/2009
JP   4-104220 A   4/1992
(Continued)

OTHER PUBLICATIONS

Ana Isabel Azcurra, et al., "Effect of the high molecular weight chitosan and sodium alginate on Candida albicans hydrophobicity and adhesion to cells," Med Oral Patol Oral Cir Bucal 2006;11:E120-5.*
(Continued)

*Primary Examiner* — Liam J Heincer
*Assistant Examiner* — Nicholas Hill
(74) *Attorney, Agent, or Firm* — Birch, Stewart, Kolasch & Birch, LLP

(57) ABSTRACT

Disclosed is a hydrogel contact lens which has improved and long-lasting wettability in the surface and inner structures, while exhibiting excellent contamination resistance, shape stability and mechanical strength. Also disclosed is a method for producing the hydrogel contact lens. The wettable hydrogel contact lens is characterized by containing an ionic hydrophilic polymer which is a compound having a hydroxy group and an anionic group. The method for producing a hydrogel contact lens is characterized in that a constituent component of the hydrogel contact lens is a copolymer containing at least a cationic monomer and an anionic monomer, and in that the method comprises a step wherein counter ions of the monomers form ionic bonds and a step wherein an ionic hydrophilic polymer, which is a compound having a hydroxy group and an anionic group, is contained.

3 Claims, 1 Drawing Sheet

(56) References Cited

U.S. PATENT DOCUMENTS

| | | | |
|---|---|---|---|
| 8,940,318 B2 * | 1/2015 | Sato et al. | 424/429 |
| 2006/0187410 A1 * | 8/2006 | Sato et al. | 351/160 R |
| 2008/0112984 A1 | 5/2008 | Schulte et al. | |

FOREIGN PATENT DOCUMENTS

| | | |
|---|---|---|
| JP | 6-508858 A | 10/1994 |
| JP | 7-157747 A | 6/1995 |
| JP | 10-197831 A | 7/1998 |
| JP | 10-253931 A | 9/1998 |
| JP | 2007-264622 A | 10/2007 |
| JP | 2008-24701 A | 2/2008 |
| WO | WO 2007/145344 A1 | 12/2007 |
| WO | WO 2008/073193 A2 | 6/2008 |

OTHER PUBLICATIONS

Salim Butrus, et al., "Blocking Candida adherence to contact lenses," Current Eye Research, vol. 5, No. 10, 1986, 745-750.*

Hyun Mee Lee, et al., "Antimicrobial Hydrogel Contact Lens Containing Alginate," Bull. Korean Chem. Soc. 2011, vol. 32, No. 12, 4239-4243.*

Ioannis Giavasis, "Microbial Polysaccharides," in Functional Food Carbohydrates, ed. Costas G. Biliaderis, Marta S. Izydorczyk, 2006, pp. 167-213.*

Machine Translation of JP2008-024701, performed on JPO website Jul. 16, 2015.*

Derwent Abstract 2008-C70123. English-language abstract for Harumasa, JP2008024701. 2008.*

International Search Report issued in PCT/JP2009/065236, dated Dec. 8, 2009.

* cited by examiner

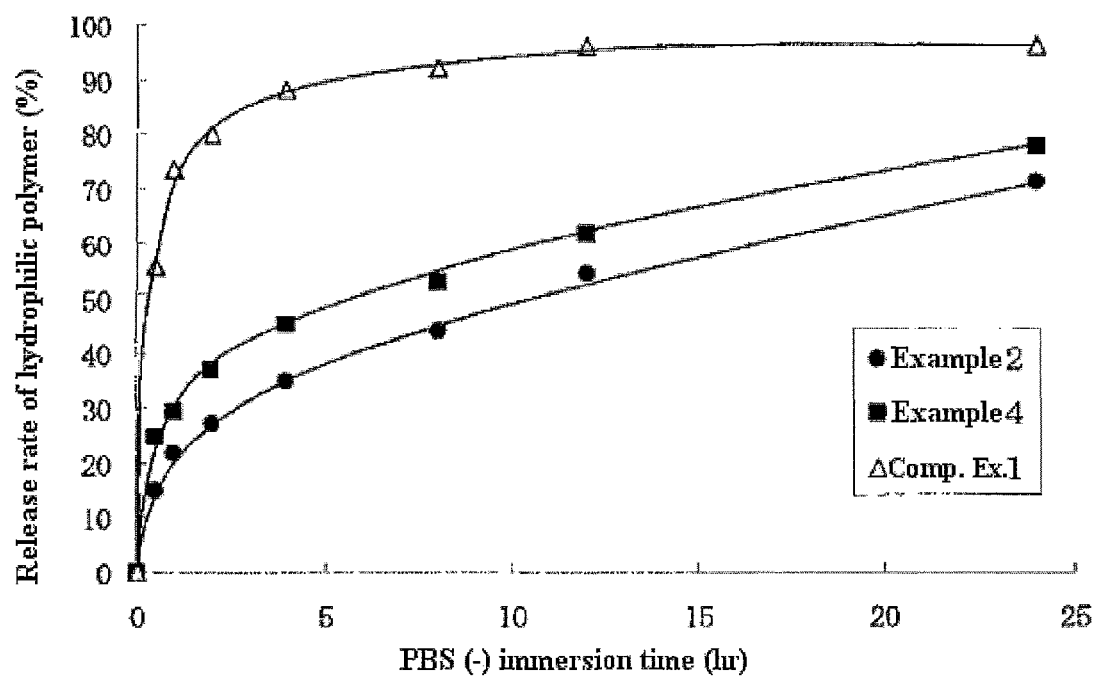

WETTABLE HYDROGEL CONTACT LENS AND METHOD FOR PRODUCING SAME

TECHNICAL FIELD

The present invention relates to a hydrogel contact lens that can maintain an excellent degree of anti-contamination property and wettability by effectively comprising an ionic hydrophilic polymer that is a compound having a hydroxyl group and an anionic group and a method of manufacturing such a contact lens. More specifically, the present invention relates to a hydrogel contact lens made to comprise an ionic hydrophilic polymer in a copolymer having at least a cationic monomer and an anionic monomer as components, which is a moisturizing hydrogel contact lens showing an excellent degree of shape stability and mechanical strength even after releasing the ionic hydrophilic polymer, and also a method of manufacturing such a contact lens.

BACKGROUND ART

Contact lenses are roughly divided into soft contact lenses and hard lenses. Soft contact lenses, in particular water-containing soft contact lenses, are widely popular because they are less foreign body sensation and provide a comfortable feeling, although the feeling of wearing the lenses fluctuates to a large extent and exerts various influences to the wearer as the surface structure of contact lens changes. The feeling of wearing a contact lens is significantly influenced by the interaction of the contact lens and tear fluid. Therefore, it is important for the lens surface to be covered by tear fluid in order to achieve a comfortable feeling of wearing contact lens. However, when a water-containing soft contact lens falls short of moisture due to evaporation while it is being worn, the soft contact lens covers the moisture shortage by absorbing moisture from tear fluid, resulting in reducing the thickness of the tear fluid layer of the wearer's eye. Then, as a result, the drying is accelerated to damage the feeling of wearing the contact lens and, what is worse, give rise to a risk of causing an outbreak of disorder at the surface of the keratoconjunctive of the contact lens wearing eye due to mechanical friction. Additionally, in recent years, drying of contact lenses and eye surfaces due to external factors including dry eye syndrome, in particular evaporative dry eye, caused by popularization of OA equipment including personal computers and influence of air conditioning systems has been apprehended. A dried contact lens can give rise to adhesion of body wastes in tear fluid to the surface of the contact lens, which causes an uncomfortable feeling of wearing the contact lens and a poor visibility. Therefore, it is vitally important to suppress drying of the contact lens and stabilize the tear fluid layer of a contact lens wearing eye in order to maintain a comfortable feeling of wearing the contact lens. For this purpose, various techniques have been disclosed, which include techniques of improving the anti-contamination property, the hydrophilicity and the wettability of a contact lens to reduce the contamination and drying of the contact lens surface by improving the base material itself of the contact lens and subjecting the obtained contact lens to a hydrophilic treatment.

For example, a water-containing contact lens that reduces the accumulation of body wastes in tear fluid on the surface of the contact lens due to the electric charge of the body wastes by forming zwitter ions including quaternary ammonium ions and carboxyl ions has been disclosed (Referenced Patent Publication 1). While this provides a technique of improving the anti-contamination property of a contact lens caused by the structure of the base material thereof, further efforts are required to improve the property of maintaining the wettability of the base material of the contact lens.

Besides, methods of improving the wettability of a contact lens by adding a moisturizing agent to a prepared contact lens have been disclosed, including a method of forming a hydrated layer on the surface of a contact lens with carboxymethyl cellulose that is an anionic polymer to impart effective lubricating ability (Referenced Patent Publication 2), a method of significantly improving the comfortableness and the moisturizing characteristic of a lens surface by causing a certain poly(oxyethylene)-poly(oxypropylene) surfactant to be retained on the lens surface (Referenced Patent Publication 3) and a method of manufacturing an ophthalmic lens by treating the ophthalmic lens with a moisturizing agent.

However, the method of Referenced Patent Publication 2 coats a contact lens surface with an anionic polymer to provide the lens surface with a wettability but the polymer does not establish any chemical bond with the lens base material so that the polymer is poorly retained on the surface. Additionally, the method merely moisturizes the lens surface and hence cannot improve the moisturizing effect of the entire contact lens. Furthermore, the lens surface is electrically charged with anions, which can induce precipitation of proteins. With the method of Referenced Patent Publication 3, the bond between the hydrophilic film and the contact lens surface is a fragile bond produced by a hydrophobic interaction and hence the method is less reliable in terms of stability and durability of the wettability. Additionally, there are reports that the non-ionic surfactant that the invention employs can induce an anaphylactic shock when administered excessively. Thus, the method is accompanied by a problem of safety that needs to be dissolved. The method of REFERENCED PATENT PUBLICATION 4 causes a contact lens to move to a large extent on the eye surface under the effect of polyvinylpyrrolidone that is employed as moisturizing agent so that a foreign body sensation can easily arise. Additionally, mucin contained in tear fluid can adhere to the contact lens surface due to the stickiness of polyvinylpyrrolidone so that a poor visibility is anticipated when this method is employed.

PRIOR ART PUBLICATIONS

Patent Publications

REFERENCED PATENT PUBLICATION 1: JP 10-253931 A

REFERENCED PATENT PUBLICATION 2: JP 2001-508555 A

REFERENCED PATENT PUBLICATION 3: JP 2002-504238 A

REFERENCED PATENT PUBLICATION 4: JP 2008-532060 A

DISCLOSURE OF THE INVENTION

Problem to be Solved by the Invention

An object of the present invention is to provide a hydrogel contact lens having an improved and durable wettability both on the surface and in the inside structure of the contact lens and showing an excellent degree of anti-contamination property, shape stability and mechanical strength, and a method of manufacturing such a contact lens.

Means for Solving the Problem

According to the present invention, there is provided a moisturizing hydrogel contact lens characterized by comprising an ionic hydrophilic polymer that is a compound having a hydroxyl group and an anionic group.

According to the present invention, there is also provided a method of manufacturing a moisturizing hydrogel contact lens, characterized in that a component of the hydrogel contact lens is a copolymer comprising at least a cationic monomer and an anionic monomer and that the method comprises the steps of:

causing paired ions of the monomers to form ionic bonds; and making the contact lens comprise an ionic hydrophilic polymer that is a compound having a hydroxyl group and an anionic group.

Advantages of the Invention

Thus, according to the present invention, it is possible to obtain a hydrogel contact lens showing an excellent degree of wettability, anti-contamination property, shape stability, and mechanical strength by making the hydrogel contact lens comprise an ionic hydrophilic polymer that is a compound having a hydroxyl group and an anionic group both on the surface and in the inside at the time of deacidification and desalination of paired ions of the cationic monomer and the anionic monomers that are components of the contact lens base material and also a method of manufacturing such a contact lens.

The method according to the present invention can improve the productivity of manufacturing contact lenses because a step of comprising an ionic hydrophilic polymer, an ionic bond formation step by way of a deacidification and desalination process and a high pressure steam sterilization step that is legally provided for contact lenses can be conducted as a single step.

Additionally, the comprised ionic hydrophilic polymer is retained in a state of being bonded to moisture in the contact lens and the retained ionic hydrophilic polymer is released gradually and continuously so that the contact lens can sustainedly maintain its wettability. Additionally, since a part of the comprised ionic hydrophilic polymer is bonded to the side chain of the cationic group that is a component of the contact lens by ionic bonding, the present invention can provide a hydrogel contact lens whose anti-contamination property, shape stability and mechanical strength are hardly degraded even after gradually releasing the ionic hydrophilic polymer.

BRIEF DESCRIPTION OF THE DRAWINGS

FIG. 1 is a graph illustrating the release rate of the ionic hydrophilic polymer having a hydrophilic group and an anionic group that is to be gradually released into a phosphoric acid buffer solution.

MODE FOR CARRYING OUT THE INVENTION

According to the present invention, a hydrogel contact lens is made to comprise an ionic hydrophilic polymer that is a compound having a hydroxyl group and an anionic group in the inside of the contact lens to improve the wettability of the contact lens.

While the compound having a hydroxyl group and an anionic group that can be used as ionic hydrophilic polymer include xanthan gum, carrageenan, celluloses comprising a carboxyl group, alginic acid and alginate, hyaluronic acid and hyaluronate, chondroitin sulfuric acid and chondroitin sulfate, 2-methacryloyloxyethyl phosphocholine polymer as well as 2-methacryloyloxyethyl phosphocholine-butyl methacrylate copolymer, alginic acid and alginate such as, sodium alginate, potassium alginate, triethanol alginate and ammonium alginate can preferably be used for the purpose of the present invention. Water soluble alginic acid and sodium alginate can more preferably be used for the purpose of the invention.

Alginic acid is a straight chain polysaccharide formed from G-guluronic acid (G), D-mannuronic acid (M) and uronic acids of two different types. It is a complex block polymer in which the homopolymer fraction of mannuronic acid (MM fraction), the homopolymer fraction of guluronic acid (GG fraction) and the fraction where mannuronic acid and guluronic acid are arranged at random (MG fraction) are bonded randomly. The gel's potential and the gel concentration of alginic acid are greatly influenced by the quantitative ratio of M and G, and the manner in which they are arranged. It is known that the gel concentration rises when the G ratio is high.

While the M/G ratio of alginic acid is not subjected to any particular limitations and can be selected appropriately for the purpose of the present invention, it is preferably 4.0 or less, more preferably 2.0 or less. According to the present invention, an ionic hydrophilic polymer is prepared with a buffer solution and employed as a liquid composition, and the prepared ionic hydrophilic polymer is added preferably by 0.01 to 7.0 w/v %, more preferably by 0.03 to 5.0 w/v %, much more preferably by 0.05 to 3.0 w/v %. When the ionic hydrophilic polymer is added by less than 0.01 w/v %, it is comprised in the hydrogel contact lens only too little so that the ionic hydrophilic polymer can hardly exert its wettability satisfactorily. When, on the other hand, the ionic hydrophilic polymer is added by more than 7.0 w/v %, the eye tissue can be irritated easily due to an excessive administration.

The hydrogel contact lens according to the present invention preferably comprises at least a cationic monomer and an anionic monomer as components. The cationic monomer to be used for the purpose of the present invention is preferably selected from monomers having a quaternary ammonium salt in the side chain. Specific examples of the cationic monomer that can be used for the purpose of the present invention include dimethylaminoethyl methyl hydroxide(meth)acrylate, dimethylaminoethyl methyl chloride methacrylate, dimethylaminoethyl methyl sulfate methacrylate, methacrylamide dimethylaminopropyl methyl chloride and vinylbenzyl triethyl ammonium chloride. Specific examples of the anionic monomer that can be used for the purpose of the present invention include ethylene-based unsaturated carboxylic acids such as (meth)acrylic acid, 2-(meth)acryloyloxyethyl succinic acid, 2-(meth)acryloyloxyethyl phthalic acid and 2-(meth)acryloyloxyethyl hexahydrophthalic acid; sulfonic acid monoesters such as methacryloyloxypropyl sulfonic acid, vinyl sulfonic acid and p-styrenesulfonic acid; and phosphoric acid monoesters such as 2-acryloyloxyethyl acid phosphate and 2-methacryloyloxyethyl acid phosphate. Of these, monomers having a carboxyl group are preferably used for the purpose of the present invention. The cationic monomer is preferably added excessively relative to the anionic monomers when they are added. More specifically, the composition ratio of the anionic monomer is preferably 50 to 95 mol %, more preferably 70 to 90 mol %, relative to the cationic monomer.

The cationic group and the anionic group of components of a contact lens according to the present invention form ionic bonds so that the anti-contamination property, the shape stability and the mechanical strength of the contact lens are improved. The ionic bonds are formed by way of a deacidification and desalination process of paired ions of the cationic group and the anionic group in the contact lens after a process of hydration and swelling. The excessive cationic groups form ionic bonds with the ionic hydrophilic polymer that is a compound having a hydroxyl group and an ionic group comprised therein, and are retained in the structure of the contact lens so that the wettability of the contact lens is sustainedly maintained.

A composition ratio of the anionic monomer relative to the cationic monomer that is less than 50 mol % unfavorably affects shape stability because the number of ionic bonds formed by paired ions in components of the contact lens is reduced. On the other hand, a composition ratio of the anionic monomer relative to the cationic monomer that exceeds 95 mol % cannot maintain any excellent wettability because there arise a shortage of formation of ionic bonds with the ionic hydrophilic polymer.

For the purpose of the present invention, a hydrophilic monomer having at least a type of hydrophilic group in the molecule can be copolymerized in order to provide the obtained hydrogel with hydrophilicity. Specific examples of the hydrophilic monomer include (meth)acryl-containing monomers such as N,N-dimethylacrylamide (DMAA), 2-hydroxyethylmethacrylate (HEMA), (meth)acrylic acid, polyethyleneglycol monomethacrylate and glycerolmethacrylate; and hydrophilic vinyl-containing monomers such as N-vinylpyrrolidone (NVP), N-vinyl-N-methylacetamide, N-vinyl-N-ethylacetamide, N-vinyl-N-ethylformamide and N-vinylformamide.

For the purpose of the present invention, alkyl(meth)acrylate can be copolymerized in order to improve the strength, shape stability and flexibility of the obtained copolymer. Examples of alkyl(meth)acrylate include straight chain, branched chain and cyclic alkyl(meth)acryates such as methyl(meth)acrylate, ethyl (meth)acrylate, propyl(meth)acrylate, i-propyl(meth)acrylate, n-butyl (meth)acrylate, i-butyl (meth)acrylate, t-butyl (meth)acrylate, pentyl(meth)acrylate, trimethyl cyclohexyl(meth)acrylate, t-butylcylcohexyl (meth)acrylate, hexyl(meth)acrylate, 2-ethylhexyl(meth) acrylate, cyclohexyl(meth)acrylate, heptyl (meth)acrylate, octyl(meth)acrylate, nonyl(meth)acrylate, decyl(meth)acrylate, dodecyl (meth)acrylate, lauryl(meth)acrylate, tridecyl (meth)acrylate, tetradecyl(meth)acrylate, methoxy diethylene glycol(meth)acrylate, ethoxy diethylene glycol(meth) acrylate, 3-methyltridecyl(meth)acrylate, 6-methyltridecyl (meth)acrylate, 7-methyltridecyl(meth)acrylate, 2,11-dimethyldodecyl(meth)acrylate, 2,7-dimethyl-4,5-diethyloctyl(meth)acrylate, pentadecyl(meth)acrylate, stearyl (meth)acrylate, i-stearyl(meth)acrylate, allyl(meth) acrylate, phenyl(meth)acrylate, phenoxyethyl(meth)acrylate, benzyl(meth)acrylate and isobornyl(meth)acrylate.

Additionally, for the purpose of the present invention, a multifunctional cross-linking component can be copolymerized in order to improve the heat resistance and the mechanical characteristics of the contact lens. Examples of the cross-linking component include (meth)acrylate-based cross-linking agents such as ethyleneglycoldi(meth)acrylate, diethyleneglycoldi(meth)acrylate, triethyleneglycoldi(meth) acrylate, propyleneglycoldi(meth)acrylate, dipropyleneglycoldi(meth)acrylate, trimethylolpropanetri(meth)acrylate, pentaerythritoltri(meth)acrylate, pentaerythritoltetra(meth) acrylate and dipentaerythritolhexa(meth)acrylate; and vinyl-based cross-linking agents such as allyl methacrylate, diallyl maleate, diallyl fumarate, diallyl succinate, diallyl phthalate, triallyl cyanurate, triallyl isocyanurate, diethylene glycol bis (allyl carbonate), triallyl phosphate, triallyl trimellitate, diallyl ether, N—N-diallylmelamine and divinyl benzene.

The improved wettability of a hydrogel contact lens according to the present invention is achieved by comprising an ionic hydrophilic polymer, that is a compound having a hydroxyl group and an anionic group, in the contact lens structure. For the purpose of the present invention, the expression of "comprise" refers to that both (a) an ionic hydrophilic polymer that forms ionic bonds with an excessive cationic group that does not participate in the deacidification and desalination process of paired ions of components of the contact lens and (b) an ionic hydrophilic polymer that does not form any ionic bond and is taken into the contact lens polymer chain, exist in the hydrogel contact lens structure. The contact lens according to the present invention is characterized by the method of making a contact lens comprise an ionic hydrophilic polymer.

As described above, the ionic bonds of paired ions of the contact lens components are formed by way of a deacidification and desalination treatment of paired ions of the cationic group and the anionic group in the contact lens after a process of hydration and swelling. According to the present invention, at the same time the ionic bonds are also formed between the ionic hydrophilic polymer and the contact lens components, and further the ionic hydrophilic polymer is taken into the contact lens polymer chain. As a result, the power by which the ionic hydrophilic polymer is retained in the contact lens structure is improved to make it possible to sustainedly maintain a moisturizing effect.

The contact lens according to the present invention shows a bonding effect that is stronger than existing contact lenses since the ionic bonds of side chains in addition to the copolymerization mediated by way of a multifunctional cross-linking component exist in the contact lens, so that the anti-contamination property, the shape stability and the mechanical strength are not affected by environmental changes such as changes in the temperature and the pH value, and maintained to a constant level. Therefore, size change and degradation of the mechanical strength of the contact lens do not occur even after the ionic hydrophilic polymer that is taken is released gradually. Furthermore, the ionic hydrophilic polymer that is bonded with cationic groups of the contact lens components as a result of forming ionic bonds is not released even gradually and held in the contact lens in a state of being bonded to moisture in the contact lens. Therefore, the wettability of the contact lens is maintained.

Besides, in the deacidification and desalination treatment for formation of ionic bonds between the ionic hydrophilic polymer and cationic groups in the contact lens components, the reaction temperature affects the formation of ionic bonds. While the deacidification and desalination treatment may be conducted alone, the treatment of making the contact lens comprise an ionic hydrophilic polymer and the step of forming ionic bonds by way of a deacidification and desalination treatment are preferably conducted at the same time for the purpose of the present invention from the viewpoint of exerting the above described effects. Zwitter ions can be formed by immersing the contact lens into a buffer solution containing the ionic hydrophilic polymer at a temperature of 30° C. or higher after the process of hydration and swelling. However, the temperature of the immersion process is preferably 70° C. or higher from the viewpoint of carrying out the process more efficiently. more preferably, the immersion process is carried out in a buffer solution containing the ionic hydrophilic polymer at a temperature of 100° C. or higher. Particularly, the immersion process is preferably carried out at a process temperature between 100° C. and 150° C., and the process time is preferably between 10 minutes and 60 minutes. While a contact lens according to the present invention is subjected to a sterilization process with high-pressure steam, the process of making the contact lens comprise the ionic hydrophilic polymer, the ionic bond formation process by way of a deacidification and desalination treatment and the high pressure steam sterilization process are preferably conducted as a single step from the viewpoint of improving the productivity. More preferably, the step is conducted under conditions of 120° C. and 30 minutes.

According to the present invention, an ionic hydrophilic polymer that is a compound having a hydroxyl group and an anionic group is prepared with a buffer solution and employed as a liquid composition. The buffer solution to be compounded is not subjected to any particular limitations so long as the solution is pharmacologically and physiologically acceptable. Examples of the buffer solution include boric acid buffer solution, phosphoric acid buffer solution, carbonic acid buffer solution, citric acid buffer solution, acetic acid buffer solution and so on, from which an appropriate buffer solution may be selected for use. Boric acid buffer solution is preferably employed from the viewpoint of the content of the ionic hydrophilic polymer in the hydrogel contact lens. More preferable candidate buffer solution includes boric acid and its salts (sodium borate, ammonium borate, borax, etc.), any of which may be used alone or any two or more of which may be used in combination.

Additionally, one or two or more agents such as surfactants, tonicity agents, stabilizing agents, chelating agents, solubilizing agents, and cooling agents may be compounded with the buffer solution containing the ionic hydrophilic polymer according to the purpose of the use thereof.

Among surfactants, non-ionic surfactants may preferably be employed. Examples of the non-ionic surfactant include polyoxyethylene polyoxypropylene glycol, polyoxyethylene alkyl ether, polyoxyethylene alkylphenyl ether, polyoxyethylene polyoxypropylene alkyl ether, diethanolamide lauric acid and polyoxyethylene hydrogenated castor oil.

Examples of the tonicity agent include potassium chloride, sodium chloride, calcium chloride, magnesium sulfate, propylene glycol and glycerin.

Examples of the stabilizing agent and the chelating agent include sodium edetate, cyclodextrin, sulfites, citric acid and the salts thereof.

Examples of the solubilizing agent include polyoxyethylene (20) sorbitan monooleate, polyethylene glycol and propylene glycol.

Examples of the cooling agent include l-menthol, d-menthol, dl-menthol, α-camphor, dl-camphor, d-borneol, bergamot oil, cool mint, fennel oil, mint oil, eucalyptus oil and geraniol oil.

Water in hydrogel is roughly divided into binding water that is bound to molecular chains and free water that is not bound. The bond is influenced to a large extent by the number of hydroxyl groups in the hydrogel. The content ratio of binding water due to hydrogen bonding increases when a large number of hydroxyl groups exist. Because the content ratio of binding water is inversely proportional to the diffusion coefficient of water, the motions of water molecules are suppressed when the content ratio of binding water is high so that the evaporation of water can be suppressed. That is, a contact lens according to the present invention is made to comprise an ionic hydrophilic polymer that is a compound having a hydroxyl group and an anionic group with an aim of introducing hydroxyl groups into the contact lens structure. As many hydroxyl groups are introduced, the content ratio of binding water in the contact lens structure rises to make it possible to improve the ability of retaining water molecules. The existence manner of binding water and free water in a contact lens structure can be analyzed by thermal analysis. Binding water is fused at the lower temperature side of 0° C. while free water is fused at or around 0° C., and the peaks can be confirmed by a thermal analysis using differential scanning calorimetry (DSC). The retentivity of wettability of a contact lens is enhanced when the content ratio of binding water is not less than 20% because the number of water molecules captured by the contact lens increases. The contact lens is dried quickly to degrade the feeling of wearing the contact lens and allow adhesion of dirt when the content ratio of binding water is less than 20% because the number of water molecules captured by the contact lens decreases.

EXAMPLES

Now, the present invention will be described further by way of examples demonstrating preferable embodiments of the present invention. Note, however, that the examples are provided to make the present invention easily understandable and that the scope of the present invention is not limited with the examples only.

<Evaluation Methods>

The tests and the evaluation methods as described below were applied as the methods for evaluating the hydrogel contact lenses according to Examples and Comparative Examples in a swollen state.

<Water Wettability>

Each sample hydrogel contact lens was subjected to a treatment of making the contact lens comprise an ionic hydrophilic polymer having a hydrophilic group and an anionic group, and then the moisture on the surface of the treated hydrogel contact lens was wiped away. Thereafter, the contact angle was measured by a drop method using Contact Angle Meter CA-D Type (available from Kyowa Interface Science Co., Ltd.).

<Measurement of Content of Hydrophilic Polymer>

Each sample hydrogel contact lens was subjected to a treatment of making the contact lens comprise an ionic hydrophilic polymer having a hydrophilic group and an anionic group, and then the moisture on the surface of the treated hydrogel contact lens was wiped away. Thereafter, the contact lens was immersed in a 1:1 solution of methanol-phosphoric acid buffer solution (PBS(−)) and the ionic hydrophilic polymer was extracted by way of high pressure steam sterilization at 121° C. for 20 minutes. The ionic hydrophilic polymer in the extracted liquid was quantified with a high performance liquid chromatography (HPLC, LC-2000Plus: available from JASCO) to measure the content of the ionic hydrophilic polymer in the contact lens structure.

<Measurement of Released Quantity of Hydrophilic Polymer>

Each sample hydrogel contact lens was subjected to a treatment of making the contact lens comprise an ionic hydrophilic polymer having a hydrophilic group and an anionic group, and then the moisture on the surface of the treated hydrogel contact lens was wiped away. Thereafter, the contact lens was immersed in a phosphoric acid buffer solution (PBS (−)) at 37° C. 30 minutes, 1 hour, 2 hours, 4 hours, 8 hours, 12 hours and 24 hours after the start of the immersion, the ionic hydrophilic polymer in the extracted liquid was quantified with a high performance liquid chromatography (HPLC, LC-2000Plus: available from JASCO) to determine the released quantity of the ionic hydrophilic polymer at each of the time points. The release ratio at each of the time points was calculated based on the released and the content quantity obtained. FIG. 1 summarily illustrates the obtained results of Examples 2 and 4, as well as Comparative Example 1, while Table 1 summarily shows the results 2 hours, 8 hours and 24 hours after the start of the immersion.

Release ratio(%)=released quantity(g)/content(g)×100

<Shape Stability>

Two hydrogel contact lenses were prepared and subjected to a treatment of making the contact lens comprise an ionic hydrophilic polymer having a hydrophilic group and an anionic group. The surface moisture of one of the two contact lenses was wiped away and then both of them were immersed in a phosphoric acid buffer solution (PBS(−)) at 37° C. for 24 hours. The diameter of the hydrogel contact lens was measured before and 24 hours after the immersion into PBS(−) to evaluate the lost quantity of the ionic hydrophilic polymer after the release thereof. A rating of "○" was given when the change in the diameter of the hydrogel contact lens was 0.2 mm or smaller before and after the immersion into PBS(−) whereas a rating of "×" was given when the change exceeded 0.2 mm.

<Evaluation of Anti-contamination Property (protein)>

Two hydrogel contact lenses were prepared and subjected to a treatment of making the contact lens comprise an ionic hydrophilic polymer having a hydrophilic group and an anionic group. The surface moisture of one of the two contact lenses was wiped away and then both of them were immersed in a phosphoric acid buffer solution (PBS(−)) at 37° C. for 24 hours. Then, each of them before and 24 hours after the immersion into PBS(−) was incubated into a publicly known artificial protein solution at 37° C.±2° C. for 8 hours, and rinsed with PBS(−). Subsequently, the artificial protein was extracted into an aqueous solution of 1% sodium lauryl sulfate-1% sodium hydrogen carbonate, and then the protein in the extracted liquid was quantified by a MicroBCA method. A rating of "○" was given when the difference in the adsorbed quantity of protein before and after the immersion into PBS (−) was 10% or smaller, whereas a rating of "×" was given when the difference exceeded 10%.

<Evaluation of Anti-contamination Property (lipid)>

Two hydrogel contact lenses were prepared and subjected to a treatment of making the contact lens comprise an ionic hydrophilic polymer having a hydrophilic group and an anionic group. The surface moisture of one of the two contact lenses was wiped away and then both of them were immersed in a phosphoric acid buffer solution (PBS(−)) at 37° C. for 24 hours. Then, each of them before and 24 hours after the immersion into PBS(−) was incubated into a publicly known artificial lipid solution at 37° C.±2° C. for 8 hours, and rinsed with PBS(−). Subsequently, the contact lenses were immersed in an solution of 0.1% Sudan Black-sesame oil. A rating of "○" was given when the difference in the dyeing conditions before and after the immersion into PBS(−) was not observed, whereas a rating of "×" was given when the difference was observed.

<Mechanical Strength>

Two hydrogel contact lenses were prepared and subjected to a treatment of making the contact lens comprise an ionic hydrophilic polymer having a hydrophilic group and an anionic group. The surface moisture of one of the two contact lenses was wiped away and then both of them were immersed in a phosphoric acid buffer solution (PBS(−)) at 37° C. for 24 hours. Then, each of the hydrogel contact lenses before and 24 hours after the immersion into PBS(−) was cut to show a dumbbell-like shape with a width of 2.0 mm and the test sample was pinched at the top and bottom ends by means of a jig. The test sample was subjected to breaking test where the test sample was tested for breaking strength and breaking elongation when pulled at a constant rate by means of a breaking tester AGS-50NJ (available from Shimadzu Corporation). A rating of "○" was given when the differences both in the breaking strength and the breaking elongation before and after the immersion into PBS(−) was 10% or smaller, whereas a rating of "×" was given when the differences exceeded 10%.

<Observation of Existence Forms of Water Molecules>

The quantity of binding water and that of free water in a sample hydrogel contact lens structure was measured, and the ratio of binding water in the hydrogel contact lens structure was calculated.

The observation was done by means of a differential scanning calorimeter (DSC) (DSC6200, available from Seiko Instruments Inc). A sample hydrogel contact lens was subjected to a treatment of making the contact lens comprise an ionic hydrophilic polymer having a hydrophilic group and an anionic group. Then, the surface moisture of the contact lens was wiped away. Then, a center part thereof was cut out and completely sealed in a hermetically sealed aluminum-made container. The contact lens was then subjected to a thermal analysis under conditions of a temperature range between −20° C. and 40° C. as well as a temperature rising rate of 5° C./min. The ratio of binding water to free water was calculated based on the area ratio of the peak of binding water at the lower temperature side of 0° C. and that of free water at or around 0° C.

<Lens Trial>

A sensory test of testing the feeling of wearing hydrogel contact lenses that were subjected to a treatment of making the contact lenses comprise an ionic hydrophilic polymer having a hydrophilic group and an anionic group was conducted. The lenses were worn throughout a day and disposed (by 20 persons), and then they were compared with hydrogel contact lenses (Comparative Example 2) not comprising any ionic hydrophilic polymer that is a moisturizing agent. The wearers were asked in the form of a questionnaire to evaluate the lenses using the evaluation standard shown below.

1 point: given when the feeling of wearing hydrogel contact lenses was better if compared with the feeling of wearing hydrogel contact lenses not comprising the moisturizing agent.

0 point: given when the feeling of wearing hydrogel contact lenses did not differ from the feeling of wearing hydrogel contact lenses not comprising the moisturizing agent.

−1 point: given when the feeling of wearing hydrogel contact lenses was worse if compared with the feeling of wearing hydrogel contact lenses not comprising the moisturizing agent.

The following rating system based on the obtained questionnaires was employed.

"○○": given when the total points of 20 persons were 15 points or more.

"○": given when the total points of 20 persons were not less than 10 points and less than 15 points.

"Δ": given when the total points of 20 persons were not less than 5 points and less than 10 points "▲": given when the total points of 20 persons were not less than 0 points and less than 5 points.

"×": given when the total points of 20 persons were less than 0 points.

[Manufacturing Hydrogel Contact Lenses]

For each sample contact lens, ethylene glycol dimethacrylate (EDMA, available from Mitsubishi Rayon Co., Ltd.), azobisisobutyronitrile (AIBN, available from Wako Pure Chemical Industries, Ltd.) and pure water were added to a 100 wt % monomer mixture solution of 2-hydroxymethacrylate (HEMA, available from
Mitsubishi Gas Chemical Company, Inc.), dimethylaminoethylchloride methacrylate (DQ-75, available from
Mitsubishi Gas Chemical Company, Inc.), methacrylamidedimethylaminopropylmethyl chloride (MAPTAC, available from MRC UNITEC Co., Ltd.),
2-methacryloyloxyethylsuccinic acid (HOMS, available from KYOEISHA CHEMICAL Co., Ltd.) and/or
2-methacryloyloxyethylhexahydrophtalic acid (HH, available from KYOEISHA CHEMICAL Co., Ltd.) by the ratio shown in Table 1, and stirred at room temperature for 30 minutes in order to obtain a uniform mixture of the ingredients. Then, the mixture was poured into a polypropylene-made mold for forming a contact lens and heated from room temperature to 100° C. over 15 hours in a nitrogen atmosphere to obtain a contact lens molded body.

[Preparation of Buffer Solution Containing Ionic Hydrophilic Polymer]

Mixtures of alginic acid (Duck Acid A: tradename, available from Kibun Food Chemifa Co., Ltd.), sodium alginate A (Duck Algin 150G: tradename, available from Kibun Food Chemifa Co., Ltd. (M/G ratio 0.5)), sodium alginate B (Duck Algin 150M: tradename, available from Kibun Food Chemifa Co., Ltd. (M/G ratio 1:1)), sodium hyaluronate (FCH-80LE: tradename, available from Kibun Food Chemifa Co., Ltd.), sodium chondroitin sulfate (available from Maruha Corp.), a buffer agent containing boric acid, borax, disodium hydrogen phosphate and/or potassium dihydrogen phosphate, a tonicity agent containing sodium chloride and/or potassium chloride, a chelating agent containing sodium edetate (EDTA-2Na) and/or a surfactant which was a non-ionic surfactant containing a polyoxyethylenepolyoxypropylene block polymer (Lutrol F127: tradename, available from BASF Japan Ltd.) were prepared to the respective ratios shown in Table 1 and stirred at room temperature for 30 minutes in order to obtain a uniform mixture of the ingredients.

Examples 1 to 11

Each of the obtained contact lens molded bodies was immersed in a phosphoric acid buffer solution (pH7) at 60° C. for 1 hour for hydration and swelling. Subsequently, it was immersed in a buffer solution containing an ionic hydrophilic polymer having a hydroxyl group and an anionic group and processed there at 121° C. for 30 minutes to carry out a step of making the contact lens molded body comprise an ionic hydrophilic polymer, an ionic bond formation step by way of a deacidification and desalination treatment and a high pressure steam sterilization step simultaneously to prepare a targeted hydrogel contact lens. The obtained hydrogel contact lens was evaluated for water wettability, the ionic hydrophilic polymer content, the released quantity of the ionic hydrophilic polymer, the existence forms of water molecules and the lens trial by means of the above-described methods.

Table 2 shows the results of the evaluations. All the hydrogel contact lenses comprised the ionic hydrophilic polymer to a large extent, and the ratio of binding water was high accompanied therewith. Additionally, a high retentivity of wettability was confirmed for all of them because they all showed only a small released quantity of the ionic hydrophilic polymer. Furthermore, the results of a lens trial were excellent to prove that the hydrophilic polymer content improved the feeling of wearing a contact lens.

Comparative Example 1

A targeted hydrogel contact lens was prepared by way of a process similar to the process of preparing the contact lenses of Examples 1 to 11 except that polyvinylpyrrolidone (K-90: tradename, available from Nippon Shokubai Co., Ltd.) as a hydrophilic polymer to be comprised in the contact lens that comprised neither an hydroxyl group nor an anionic group was employed. The obtained hydrogel contact lens was evaluated for water wettability, the hydrophilic polymer content, the released quantity of the hydrophilic polymer, the existence forms of water molecules and the lens trial by means of the above-described methods.

The hydrogel contact lens did not comprise the ionic hydrophilic polymer, and thereby the retentivity of wettability was low. In other words, the wettability was not maintained. Additionally, the ratio of binding water was small to give rise to a poor feeling of wearing the contact lens.

Comparative Example 2

A targeted hydrogel contact lens was prepared by way of a process similar to the process of preparing the contact lenses of Examples 1 through 11 except that it was processed with a buffer solution only as one not comprising hydrophilic polymer. The obtained hydrogel contact lens was evaluated for water wettability, the hydrophilic polymer content, the released quantity of the hydrophilic polymer, the existence forms of water molecules and the lens trial by means of the above-described methods.

Since the contact lens did not comprise any hydrophilic polymer, the ratio of binding water was low so that the lens surface dried to give rise to a poor feeling of wearing the contact lens.

TABLE 1

| | | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Comp. Ex. 1 | Comp Erx. 2 |
|---|---|---|---|---|---|---|---|---|---|---|---|---|---|---|---|
| Lens ingredients composition (weight portions) | HEMA | | 79 | 82 | 70 | 81 | 82 | 77 | 77 | 77 | 70 | 70 | 77 | 79 | 82 |
| | DQ-75 | | 11 | 11 | 16 | — | — | — | — | — | 16 | 16 | — | 11 | 11 |
| | MAPTAC | | — | — | — | 11 | 11 | 14 | 14 | 14 | — | — | 14 | — | — |
| | HOMS | | 10 | — | 14 | 8 | — | — | — | — | 14 | 14 | — | 10 | — |
| | HH | | — | 7 | — | — | 7 | 9 | 9 | 9 | — | — | 9 | — | 7 |
| | $H_2O$ | | 1.2 | 1.2 | 1.2 | 1.2 | 1.2 | 1.2 | 1.2 | 1.2 | 1.2 | 1.2 | 1.2 | 1.2 | 1.2 |
| | EDMA | | 0.6 | 0.6 | 0.6 | 0.6 | 0.6 | 0.6 | 0.6 | 0.6 | 0.6 | 0.6 | 0.6 | 0.6 | 0.6 |
| | AIBN | | 0.2 | 0.2 | 0.2 | 0.2 | 0.2 | 0.2 | 0.2 | 0.2 | 0.2 | 0.2 | 0.2 | 0.2 | 0.2 |
| Buffer solution composition | Hydrophilic polymer | Alginic acid | 0.01 | 0.5 | 0.5 | — | — | 1.0 | — | — | — | — | 7.0 | — | — |
| | | Sodium alginate A | — | — | — | 0.2 | — | — | 3.0 | — | — | — | — | — | — |

TABLE 1-continued

|  |  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Comp. Ex. 1 | Comp Erx. 2 |
|---|---|---|---|---|---|---|---|---|---|---|---|---|---|---|
| (weight portions) | Sodium alginate B | — | — | — | — | 0.2 | — | — | 5.0 | — | — | — | — | — |
|  | Sodium hyaluronate | — | — | — | — | — | — | — | — | 0.5 | — | — | — | — |
|  | sodium chondroitin sulfate | — | — | — | — | — | — | — | — | — | 0.5 | — | — | — |
|  | PVP (K-90) | — | — | — | — | — | — | — | — | — | — | — | 0.05 | — |
|  | Boric acid | 0.99 | 0.99 | — | 0.99 | 0.99 | 0.99 | 0.99 | 0.99 | — | 0.99 | 0.99 | 0.99 | — |
|  | Borax | 0.38 | 0.38 | — | 0.38 | 0.38 | 0.38 | 0.38 | 0.38 | — | 0.38 | 0.38 | 0.38 | — |
|  | EDTA-2Na | 0.05 | 0.05 | — | 0.05 | 0.05 | 0.05 | 0.05 | 0.05 | — | 0.05 | 0.05 | 0.05 | — |
|  | Sodium chloride | 0.3 | 0.3 | 0.8 | 0.3 | 0.3 | 0.3 | 0.3 | 0.3 | 0.8 | 0.3 | 0.3 | 0.3 | 0.8 |
|  | Potassium chloride | — | — | 0.02 | — | — | — | — | — | 0.02 | — | — | — | 0.02 |
|  | Disodium hydrogen phosphate | — | — | 0.12 | — | — | — | — | — | 0.12 | — | — | — | 0.12 |
|  | Potassium dihydrogen phosphate | — | — | 0.02 | — | — | — | — | — | 0.02 | — | — | — | 0.02 |
|  | Lutrol F127 | — | 0.05 | — | — | 0.05 | — | — | — | — | — | — | 0.05 | 0.05 |

TABLE 2

|  |  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Comp. Ex. 1 | Comp. Ex. 2 |
|---|---|---|---|---|---|---|---|---|---|---|---|---|---|---|
| Evaluation result | Water wettability (°) | 74 | 71 | 70 | 72 | 73 | 70 | 70 | 69 | 73 | 72 | 67 | 88 | 92 |
|  | Content (μg/lens) | 128 | 534 | 498 | 308 | 321 | 650 | 726 | 1002 | 345 | 92 | 1215 | 23 | — |
|  | Release ratio (%) after 2 hours | 24 | 23 | 30 | 30 | 35 | 38 | 33 | 38 | 26 | 32 | 34 | 80 | — |
|  | after 8 hours | 52 | 42 | 51 | 53 | 52 | 50 | 50 | 52 | 56 | 59 | 55 | 92 | — |
|  | after 24 hours | 87 | 72 | 70 | 77 | 75 | 72 | 72 | 75 | 79 | 78 | 80 | 96 | — |
|  | Shape stability | ○ | ○ | ○ | ○ | ○ | ○ | ○ | ○ | ○ | ○ | ○ | ○ | ○ |
|  | Anti-contamination property (protein) | ○ | ○ | ○ | ○ | ○ | ○ | ○ | ○ | ○ | ○ | ○ | x | — |
|  | Anti-contamination property (lipid) | ○ | ○ | ○ | ○ | ○ | ○ | ○ | ○ | ○ | ○ | ○ | x | — |
|  | Mechanical strength | ○ | ○ | ○ | ○ | ○ | ○ | ○ | ○ | ○ | ○ | ○ | ○ | — |
|  | Binding water (%) | 20.3 | 23.7 | 23.5 | 23.1 | 22.8 | 24.1 | 23.3 | 24.0 | 23.7 | 23.0 | 23.9 | 12.6 | 12.8 |
|  | Lens trial | ○ 14 | ○○ 16 | ○○ 17 | ○○ 15 | ○○ 19 | ○ 13 | ○ 12 | ○ 10 | ○○ 15 | ○○ 16 | Δ 5 | x −3 | — |

The invention claimed is:

1. A moisturizing hydrogel contact lens, comprising:
a copolymer prepared from at least a cationic monomer and an anionic monomer;
an ionic hydrophilic polymer, wherein the ionic hydrophilic polymer is present on a surface and in an interior of the hydrogel contact lens, and wherein the ionic hydrophilic polymer is alginic acid or alginate;
wherein ionic bonds are present between a cationic group of the cationic monomer component of the copolymer and an anionic group of the ionic hydrophilic polymer; and
wherein a content of the alginic acid or alginate in an interior of the hydrogel contact lens is 128 μg/lens to 1215 μg/lens.

2. The moisturizing hydrogel contact lens according to claim 1, wherein paired ions of the cationic and anionic monomer components of the copolymer form ionic bonds between the cationic and anionic monomer components.

3. The moisturizing hydrogel contact lens according to claim 2, wherein the cationic monomer component of the copolymer has a quaternary ammonium salt; and the anionic monomer component of the copolymer has a carboxyl group; wherein the ionic bonds are formed by way of a deacidification or desalination treatment of the paired ions of the cationic and anionic monomer components of the copolymer.

* * * * *